July 20, 1954  S. W. HOWARTH  2,683,976
MACHINE FOR THE REMOVAL OF BEARD AND GROUND HAIRS
FROM RABBIT, HARE, AND OTHER FUR BEARING SKINS
Filed Nov. 13, 1951  2 Sheets-Sheet 1
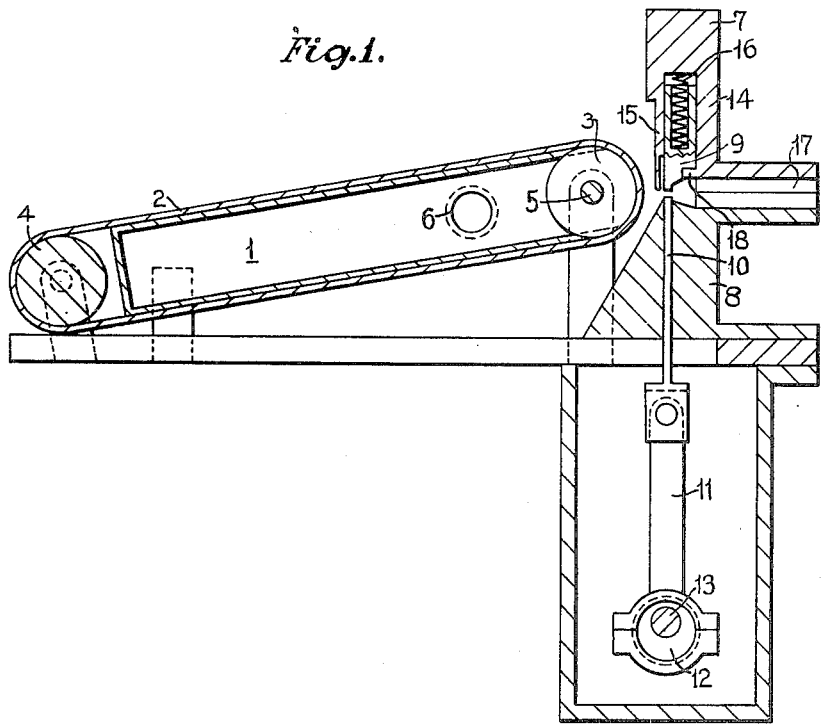
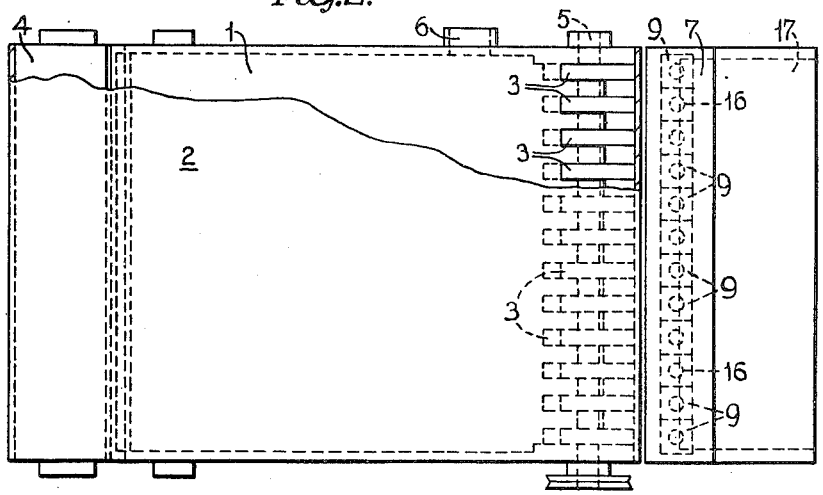
Inventor
Stanley William Howarth
By Ferdinand Broster Bosshardt
Attorney Inventor
*Stanley William Howarth*
By
*Ferdinand Broster Boschardt*
Attorney Patented July 20, 1954

2,683,976

UNITED STATES PATENT OFFICE 2,683,976

MACHINE FOR THE REMOVAL OF BEARD AND GROUND HAIRS FROM RABBIT, HARE, AND OTHER FUR BEARING SKINS

Stanley William Howarth, Bramhall, England

Application November 13, 1951, Serial No. 255,941

7 Claims. (Cl. 69—26)

This invention relates to the removal of the coarse outer fur, hereinafter referred to as beard, and ground hairs, hereinafter referred to as ground hairs, from rabbit, hare and other fur-bearing skins prior to the removal of the down hairs or the finer inner fur, hereinafter referred to simply as the fur, from the skin to enable the fur to be used in felt or felt hat making.

Previous to my invention a machine for the removal of the said beard and hairs was used, comprising a pair of nipping rollers, one of which was fluted, and a metal bar which was movable by the operator towards and away from the nipping rollers, the skin being drawn over the bar to present different parts thereof to the rollers and the bar being moved to bring the beard and said hair within reach of the nip of the rollers.

According to the said invention a machine for the removal of beard and ground hairs from rabbit, hare and other fur-bearing skins has a perforate conveyor band co-operating with a vacuum to feed and hold the skin before a reciprocatory mechanism adapted to grip the beard and ground hairs and break the beard off the fur and pull the ground hairs out of the skin.

The conveyor band may be mounted on two rollers, one of which is adjacent to the reciprocatory mechanism and is annularly slotted or ribbed or built up of spaced discs so that the roller permits co-operation of the perforate conveyor band with the vacuum even at the place where it is riding on the last named roller.

The reciprocatory mechanism is preferably adapted to displace and pull the beard and ground hair laterally after they have been gripped, a blade being provided in association with the said mechanism for the fur and ground hairs to be bent over whilst the beard is being broken off and the ground hairs are being pulled out.

Suction means may be provided to draw the ground hairs and the fur with its beard into a position favourable to the gripping of the beard and ground hairs by the reciprocatory mechanism.

Suction means may also be provided to draw the beard and ground hairs away after they have been removed from the skin and then released by the reciprocatory mechanism.

The reciprocatory mechanism may comprise a series of pairs of jaws arranged side by side and operating at staggered periods, one jaw of each pair being positively actuated and the other jaw of each pair being displaceable by the first jaw against a spring load, and the jaws of each pair being adapted to grip beard and ground hairs between them and pull the gripped beard and ground hairs upwards or downwards.

Air suction means may be provided to draw air strongly between the jaws of each pair when open and thereby draw the still attached beard and ground hairs which are adjacent the open jaws into position between the open jaws for being gripped by the jaws.

The first named jaws may be operated by eccentrics, cams, cranks or the like.

A stationary blunt edged blade may be provided in association with the jaws to bend the gripped beard at the junction between the beard and the fur and bend the gripped ground hairs at a similarly spaced distance from the skin before the beard and ground hairs are pulled, whereby a frictional resistance is caused by the edge of the blade which operates to prevent the fur from being pulled out of the skin by the pull which the mechanism exerts upwardly or downwardly to break the beard and pull out the ground hairs.

In the accompanying more or less diagrammatical drawings—

Figure 1 is a side view in section of a machine for removing beard and ground hairs;

Figure 2 is a plan view, with a portion broken away, of the machine illustrated in Figure 1.

Figure 3:
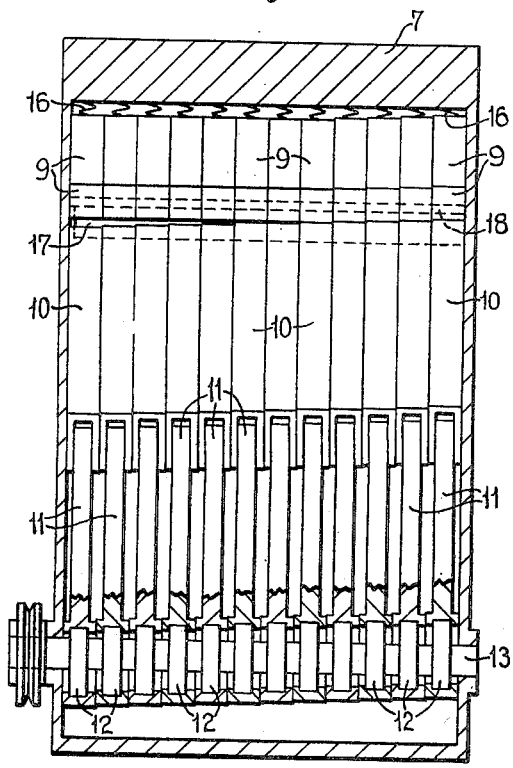
Figure 3 is an end view in section of the machine illustrated in Figure 1.

Referring to the drawings, in the construction of machine for removing beard and ground hairs shown in Figures 1, 2 and 3, there is a vacuum bed which comprises a vacuum box 1, and a travelling perforate brattice 2 mounted on an annularly slotted roller 3 and an unslotted roller 4 and driven by rotation of a shaft 5 of the annularly slotted roller 3 from a driven main shaft (not shown) of the machine. A skin placed non-fur-bearing side down on the vacuum bed is carried by the perforate brattice 2 round the slotted roller 3, the skin being caused to cling tightly to the brattice 2 by the partial vacuum created in the vacuum box 1 by a suitable air exhausting device connected to the box by a pipe 6.

Behind the brattice 2 there are guides 7 and 8 between which two sets of gripping slide pieces 9 and 10 are respectively arranged with their pieces side by side and touching. One set is a driven set and each slide piece 10 thereof is connected by a connecting rod 11 to an eccentric 12 mounted on a shaft 13, the eccentrics 12 being disposed side by side and displaced angularly relative to one another so that the driven slide pieces 10 reciprocate up and down in staggered relationship. These positively driven pieces 10 co-operate with the gripping pieces 9 of the other set which is a complementary set whose pieces 9 are located above the driven pieces 10 and each mounted to slide in the guide 7 which is composed of a rear guide surface 14 and a front blade plate 15. Each of the complementary pieces 9 is acted on by a compression spring 16. These springs 16 yieldingly resist upward movement of the complementary gripping pieces 9 and therefore cause a nip between the driven slide pieces 10 and the complementary slide pieces 9. The driven pieces 10 and complementary gripping pieces 9 slide in a vertical plane which may be at an oblique angle to the vacuum bed, as shown in Figure 1, and situated at such a distance behind the brattice 2 on the slotted roller 3 that the beard and ground hair projecting beyond the fur can be in vertical register with the pieces 9 and 10.

A passage 17 is provided behind the pieces 9 and 10 and is connected to an air exhausting device (not shown). The front of the passage 17 is formed by the guides 7 and 8 and the reciprocated pieces 9 and 10 which allow air to be drawn between each driven piece 10 and its complementary piece 9 when they are separated, and prevents air from being drawn between each driven piece 10 and its complementary piece 9 when they are closed together on the beard and ground hair of the skin. A stop 18 limits the lowermost position of the complementary pieces 9.

In operation, each driven gripping piece 10 is caused to perform an upward stroke which is sufficient firstly to close the gap between it and its complementary piece 9 and secondly to push its complementary piece 9 upwards until the junction of the two pieces 9 and 10 is higher than the blunt lower edge of the blade plate 15. The period of ascent and descent of each driven piece 10 differs in time from the period of ascent and descent of the remaining driven pieces 10. This results in pieces 10 becoming operative at different times and in the front of the said passage 17 being never simultaneously open across the whole width of the machine.

The strong current of air drawn into the passage 17 between each driven piece 10 and its complementary piece 9 whilst a gap exists between them draws the still attached beard and ground hairs in the vicinity into the gap to a sufficient extent to cause the said beard and ground hairs to be gripped in the nip of the two pieces 9 and 10 when the gap closes. The said beard and ground hairs whilst gripped are then moved upwards, due to the continued upward motion of the driven piece 10 and the upward motion of the complementary piece 9 produced by the thrust of the driven piece 10 against the action of the compression spring 16. This movement of the two pieces 9 and 10 bends the fur and attached beard over the edge of the blade plate 15 at the junction between the fur and the beard, which is the tensilely weakest place along the fur and attached beard and also exerts a pull on the beard. The bending and pulling effected by the two pieces 9 and 10 causes the beard to break away from the fur at the said weakest place and therefore the whole of the beard, but no fur, is removed from the skin, the fur of which remains adherent to the skin. The fur, assisted by the friction set up by the bending over the blunt edge of the blade plate 15, is sufficiently firmly attached to the skin as not to be pulled out by the force necessary to break the beard off its end. The ground hair gripped by the two pieces is bent and pulled entirely out of the skin. The driven piece 10 then sinks and is followed by the complementary piece 9 which is forced downwards by the compression spring 16 until the complementary piece 9 is stopped by the stop 18, whereupon the driven piece 10 separates from the complementary piece 9 and the detached beard and ground hair are thereby freed and removed by the air current flowing through the gap between the two pieces 9 and 10. Shortly after each two pieces of the row commence their cycle of operations, the following two pieces in the row commence their cycle of operations. Therefore, although all the pieces 9 and 10 together act on the beard and ground hairs across the whole width of the skin, only a portion of the beard and ground hairs extending across the width is removed at a time and therefore the pull exerted on the skin by the pieces is not sufficient to drag the skin away from the brattice 2 or displace the skin thereon. As the brattice 2 travels it presents fresh parts of the skin to the pieces 9 and 10 and therefore the beard and ground hairs are removed from end to end of the skin.

Figure 4:
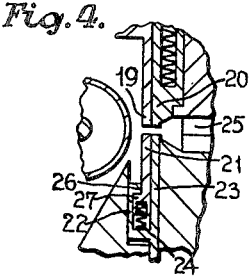
Figure 4 is a fragmentary side view in section illustrating another construction.

In the construction shown in Figure 4 the machine is similar to that hereinbefore described with reference to Figures 1, 2 and 3, except in the following respects:—In place of the blade plate 15, there is provided a stationary jaw 19. Complementary movable jaws 21 which co-operate with the stationary jaw 19 are slidably mounted side by side on projecting parts 22 on driven gripping slide pieces 23 corresponding in operation and purpose to the driven pieces 10 of the hereinbefore described machine. Each jaw 21 has a compression spring 24 provided between it and the respective projecting part 22. Each part 22 has a stop 26 which by co-operation with a shoulder 27 on the jaw 21 prevents the spring 24 from displacing the jaw upwards beyond the upper edge of the slide piece 23 on which it is mounted.

In operation, each driven slide piece 23 is caused to rise in its turn and in so doing raises its associated jaw 21. Each jaw 21 in turn grips between it and the stationary jaw 19 the fur and still attached beard at one side of the junction between the fur and beard. Each driven slide piece 23 grips the beard and ground hairs at the other side of the said junction between it and complementary piece 20, of which there is a plurality corresponding to pieces 9 of Figures 1–3. The subsequent operation of the pieces 20 and 23 is similar to that described hereinbefore with reference to the pieces 9 and 10. The jaws 19 and 21 remain stationary, whilst the pieces 23 and 20 move upwards. The compression spring 24 enables the piece 23 to raise the jaw 21 until the jaw 21 is stopped and thereupon to continue its upward movement whilst leaving the piece 21 in its stopped state and restores the jaw 21 to its initial position relative to the piece 23 when the piece 23 is moved into its lowered position. The pieces 20 and 23 exert a lateral pulling force on the beard and ground hairs and exert a lateral pull which breaks the beard off the fur and breaks off the ends of the ground hairs about level with the tips of the fur. On the return of the pieces 20 and 23 to their disengaged positions the removed beard and ground hairs are free to be removed in the hereinbefore described manner by an air current flowing through a passage 25 which corresponds to the passage 17 of the hereinbefore first described construction. The holding grip exerted by the jaws 19 and 21 renders it possible to employ a lower skin-holding vacuum than that required in the hereinbefore first described construction.

Instead of a plurality of jaws 21, a plurality of slide pieces 23 and a plurality of complementary pieces 20, there may be only one of each of these extending across the machine to take the place of the said pluralities.

I claim—

1. A machine for the removal of beard and ground hairs from rabbit, hare and other fur-bearing skins, said machine comprising a perforate conveyor band, rollers on which said conveyor band is mounted, one of said rollers having annular gaps, means for driving said conveyor band, suction means co-operating with said conveyor band for holding a skin thereon, and a series of separately operating reciprocatory mechanisms distributed across the machine for gripping the beard and ground hairs of the skin at different places across the skin and at different times when the skin is fed therebefore by the conveyor and for breaking the beard off the ends of the fur and pulling the ground hairs out of the skin, said roller with gaps being disposed adjacent said reciprocatory mechanisms and permitting co-operation of said perforate conveyor band with said suction means at the place where it is riding on said roller with gaps.

2. A machine for the removal of down and ground hairs from rabbit, hare and other fur-bearing skins, said machine comprising a perforate conveyor band, means for moving said conveyor band, suction means co-operating with said conveyor band for holding a skin thereon, a row of separately operating reciprocatory gripping mechanisms for gripping the beard and ground hairs of the skin when the skin is fed therebefore by the conveyor band, driving means for making the gripping mechanisms grip in succession and at different moments, and a blade in association with said reciprocatory mechanisms, said reciprocatory mechanisms being for exerting a lateral displacing pull on the beard and ground hairs and for bending the fur and ground hairs over said blade whilst the beard is being broken off and the ground hairs are being pulled out.

3. A machine for the removal of beard and ground hairs from rabbit, hare and other fur-bearing skins, said machine comprising a perforate conveyor band, means for moving said conveyor band, suction means co-operating with said conveyor band for holding a skin thereon, pairs of jaws arranged in series side by side, means for positively reciprocating one jaw of each pair, the other jaw of each pair being displaceable by the first jaw, and a compression spring associated with said second-named jaw against the action of which said second-named jaw is displaceable, said pairs of jaws operating at staggered periods and being for gripping beard and ground hairs between them, and for pulling the gripped beard and ground hairs to break the beard off the fur and pull the ground hairs out of the skin.

4. A machine for the removal of beard and ground hairs from rabbit, hare and other fur-bearing skins, said machine comprising a perforate conveyor band, means for moving said conveyor band, suction means co-operating with said conveyor band for holding a skin thereon, pairs of jaws arranged in series side by side, means for positively reciprocating one jaw of each pair, the other jaw of each pair being displaceable by the first jaw, a compression spring associated with said second-named jaw against the action of which said second-named jaw is displaceable, and suction means for drawing air strongly between the jaws of each pair when open and thereby drawing the still attached beard and ground hairs which are adjacent the open jaws into position between the open jaws, said pairs of jaws operating at staggered periods and being for gripping beard and ground hairs between them, and for pulling the gripped beard and ground hairs to break the beard off the fur and pull the ground hairs out of the skin.

5. A machine for the removal of beard and ground hairs from rabbit, hare and other fur-bearing skins, said machine comprising a perforate conveyor band, means for moving said conveyor band, suction means co-operating with said conveyor band for holding a skin thereon, pairs of jaws arranged in series side by side, an eccentric for positively reciprocating one jaw of each pair, the other jaw of each pair being displaceable by the first jaw, a compression spring associated with said second-named jaw against the action of which said second-named jaw is displaceable, and suction means for drawing air strongly between the jaws of each pair when open and thereby drawing the still attached beard and ground hairs which are adjacent the open jaws into position between the open jaws, said pairs of jaws operating at staggered periods and being for gripping beard and ground hairs between them, and for pulling the gripped beard and ground hairs to break the beard off the fur and pull the ground hairs out of the skin.

6. A machine for the removal of beard and ground hairs from rabbit, hare and other fur-bearing skins, said machine comprising a perforate conveyor band, means for moving said conveyor band, suction means co-operating with said conveyor band for holding a skin thereon, pairs of jaws arranged in series side by said, means for positively reciprocating one jaw of each pair, the other jaw of each pair being displaceable by the first jaw, a compression spring associated with said second-named jaw against the action of which said second-named jaw is displaceable, and a stationary blunt edged blade in association with said jaws, said pairs of jaws operating at staggered periods and being for gripping beard and ground hairs between them, said blade being for bending the gripped beard at the junction between the beard and the fur and for bending the gripped ground hairs at a similarly spaced distance from the skin, and said jaws being for pulling the gripped beard and the gripped bent ground hairs to break the beard off the fur across the blade and pull the ground hairs out of the skin.

7. A machine for the breaking off of beard from the fur of rabbit, hare and other fur-bearing skins and at the same time the pulling out of ground hairs from the skin thereof, said machine comprising a perforate conveyor, means for moving said conveyor, a suction box and a rotatable suction roller co-operating with said conveyor for holding a skin thereon, and a series of separately operating reciprocatory mechanisms for gripping different parts of the beard and ground hairs across the skin at different times when the skin is fed therebefore by the conveyor and for breaking the beard off the fur and pulling the ground hairs out of the skin.

References Cited in the file of this patent

UNITED STATES PATENTS

| Number | Name | Date |
|---|---|---|
| 1,863,727 | Plass | June 21, 1932 |

FOREIGN PATENTS

| Number | Country | Date |
|---|---|---|
| 97,496 | Austria | July 10, 1924 |
| 255,963 | Italy | Nov. 29, 1927 |
| 627,516 | France | June 11, 1927 |